United States Patent Office 3,374,226
Patented Mar. 19, 1968

3,374,226
17-ETHERS OF 17α-HALOETHYNYL-17β-HYDROXY-19-NOR-4,9-ANDROSTADIENE-3-ONES
John Fried, Palo Alto, Calif., and Thomas F. Bry, Linden, N.J., assignors to Merck & Co., Inc., Rahway, N.J., a corporation of New Jersey
No Drawing. Continuation-in-part of application Ser. No. 234,204, Oct. 30, 1962. This application Oct. 18, 1965, Ser. No. 497,463
15 Claims. (Cl. 260—239.5)

This is a continuation-in-part of Ser. No. 234,204, now abandoned, filed Oct. 30, 1962, which is a continuation-in-part of Ser. No. 128,977, filed Aug. 3, 1961 now U.S. Patent No. 3,096,353, which is a continuation-in-part of Ser. No. 99,668, filed Mar. 31, 1961, which, in turn, is a continuation-in-part of Ser. No. 88,575, filed Mar. 2, 1961 now U.S. Patent No. 3,072,646.

This invention is concerned generally with novel steroid compounds and processes for preparing the same. More particularly, it relates to novel 17α-halohydrocarbon-19-nor-4,9-androstadiene-3-ones and to closely related compounds, in particular 17β-ethers thereof such as the 17β-alkyl, 17β-cycloalkyl, 17β-aralkyl ethers, 17β-unsaturated hydrocarbon ethers and 17β-substituted amino alkyl ethers and the 17β-acyl esters thereof such as 17β-alkanoyl esters and 17β-alkyl carbonates.

The compounds prepared by our invention are valuable as orally and parenterally active progestational agents, which also have the property of inhibiting gonadotrophin secretion. The compounds are useful in the treatment of various human ailments requiring progestional hormone therapy as well as in the synchronization of the estrus in the domestic animals.

The presently invented compounds include compounds having the following structural formula:

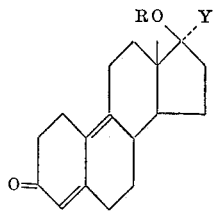

wherein R is a hydrocarbon radical having from 1 to 8 carbon atoms, for example, an alkyl radical suitably methyl, ethyl, butyl, amyl or hexyl, a cycloalkyl radical such as cyclopentyl, cyclohexyl, or an aralkyl radical such as benzyl, an unsaturated aliphatic radical such as allyl or cyclohexenyl, or a substituted amino alkyl radical, such as diethyl amino or morpholino propyl, or an alkoxy carbonyl radical such as ethoxy carbonyl, or the like, and Y is an unsaturated halogenated hydrocarbon radical containing from 2 to 3 carbon atoms such as bromoethynyl, chloroethynyl, or fluoroethynyl.

The 17β-ethers of these 4,9-androstadiene-3-ones are prepared, in accordance with the presently invented process, starting with 3-methoxy-19-nor-2,5(10)-androstadiene-17-one which has the following structural formula:

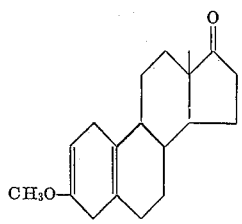

This 3-methoxy-19-nor-2,5(10)-androstadiene-17-one is reacted with a haloethyne to form the corresponding 17α-haloethynyl - 3 - methoxy - 19 - nor - 2,5(10) - androstadiene17β-ol, which has the following structural formula:

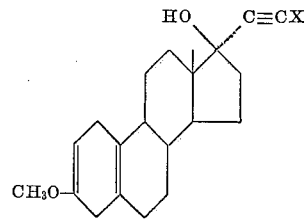

wherein X stands for chloro, bromo, or fluoro.

In a preferred embodiment of this procedure, the haloethyne is formed in situ by the reaction of a 1,2-dihaloethylene (preferably the cis form) and methyl lithium. For example, the 17α-chloroethynyl-3-methoxy-19-nor-2,5(10)-androstadiene-17β-ol is prepared by adding a solution of cis-1,2-dichloroethylene in ether to a solution of methyl lithium at about 0° C. in ether. The reaction mixture is stirred under nitrogen for 1–2 hours, and to the resulting solution containing the chloroethyne is added 3-methoxy-19-nor-2,5(10)-androstadiene-17-one, and stirring is continued for several hours longer.

The 17α - haloethynyl - 3 - methoxy - 19 - nor -2,5(10)-androstadiene-17β-ol may be converted into a 17α-haloethynyl - 17β - hydroxy - 19 - nor - 5(10) - androstene-3-one which has the following formula:

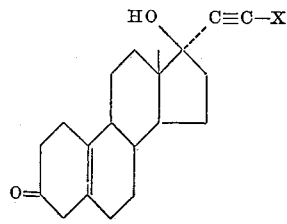

wherein X stands for chloro, bromo, or fluoro, by reaction with a weak organic acid, such as acetic acid. For example, a mixture of the steroid and glacial acetic acid in an aqueous solution of absolute ethanol and dioxane is left standing at room temperature for several hours.

The 17α - haloethynyl - 17β - hydroxy - 19 - nor - 4,9-androstadiene-3-one which has the following formula:

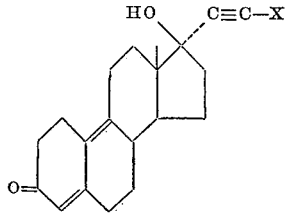

wherein X stands for chloro, bromo or fluoro, may be prepared by treatment of 17α-haloethynyl-17β-hydroxy-19-nor-5(10)-androstene-3-one with approximately one equivalent of bromine in pyridine solution, or with pyridine perbromide hydrobromide.

The 17α-haloethynyl-17β-hydroxy - 19-nor-4,9-androstadiene-3-ones of this invention are readily converted into the corresponding 17β-aralkyl, 17β-alkyl, 17β-cycloalkyl ethers, 17β-unsaturated aliphatic ethers and 17β-substituted amino alkyl ethers by reaction when an aralkyl, an alkyl, a cycloalkyl, or unsaturated aliphatic or a substituted amino alkyl halide or sulfate and a base.

In one modification of this process the 17β-hydroxy compound is reacted with a halide and silver oxide in a solvent such as a dialkyl alkanoylamide such as dimethyl formamide and the like to form the corresponding 17β-ether. The halides which may be used for this purpose include methyl iodide, ethyl iodide, and propyl iodide, isopropyl iodide, butyl iodide, isobutyl iodide, amyl iodide, isoamyl iodide, hexyl iodide and the corresponding alkyl bromides. Also suitable are the cycloalkyl halides such as cyclopentyl iodide, cyclohexyl iodide, cyclopentyl bromide and cyclohexyl bromide, and aralkyl halides preferably benzyl iodide. The unsaturated aliphatic halides such as allyl bromide and cyclohexenyl iodide as well as the substituted amino alkyl halides such as diethyl amino ethyl bromide, pyrrolidyl ethyl bromide and morpholino propyl bromide may also be used.

The steroid alcohol, for example 17α-chloroethynyl-17β-hydroxy-19-nor-4,9-androstadien-3-one is mixed with the solvent, for example dimethyl formamide in the presence of the halide such as ethyl iodide, and silver oxide is added. The mixture is stirred at from about 10° to about 80° C. for from 2 to 6 days, from 15°–30° C. for 4 days being preferred, a small amount of silver oxide being added each day. The product is then isolated. In one mode of isolation a reaction inert, water immiscible solvent, for example a halogenated hydrocarbon solvent suitably chloroform is added to the reaction mixture which is then stirred and filtered. The solvent is removed from the filtrate preferably by evaporation under reduced pressure and the residue chromatographed.

Alternatively the 17β-hydroxy steroid may be taken up in a reaction inert organic solvent, such as an aromatic hydrocarbon solvent, for example, benzene or toluene, and treated with an aliphatic halide, any of the aralkyl, alkyl, cycloalkyl, unsaturated aliphatic and substituted amino alkyl halides listed in the above-mentioned modification of the process being suitable, in the presence of an alkali metal hydride such as sodium or potassium hydride to produce the 17β-ether.

The steroid alcohol, for example 17α-fluoroethynyl-17β-hydroxy-19-nor-4,9-androstadien-3-one is dissolved in a reaction inert organic solvent, for example, benzene and the aliphatic halide in a similar solvent, for example cyclopentyl iodide in benzene is added. A small excess of halide is used. The alkali metal hydride, suitably sodium hydride is then suspended in the same solvent and added to the mixture. The mixture is then agitated for from about 1 to about 36 hours at a temperature of from about 10° to 80° C., agitation for 18 hours at from about 15° C. to about 30° C. being preferred. The product is then isolated. In one suitable method of isolation, water is added to the mixture to destroy any remaining alkali metal hydride and the mixture extracted with a reaction inert water immiscible solvent such as benzene or ether. The organic extract is then dried over a suitable drying agent, such as potassium carbonate and filtered. The solvent is then removed, suitably by evaporation under reduced pressure and the residue further purified by chromatography.

In yet another modification of the process, the 17β-hydroxy steroid is reacted with an aryl and alkyl alkali metal salt such as methyl lithium, butyl lithium, or phenyl lithium to produce a corresponding 17β-oxy lithium salt which is then treated with an aralkyl, alkyl, cycloalkyl, unsaturated aliphatic or substituted amino alkyl halide. Any of the halides utilized in the previous modification of this process being suitable to produce the desired 17β-aralkoxy, 17β-alkoxy, 17β-cycloalkoxy, 17β-unsaturated aliphatoxy, or 17β-substituted amino alkoxy steroid.

The steroid alcohol, for example 17α-bromoethynyl-17α-hydroxy-19-nor-4,9-androstadien-3-one is taken up in an ether, diethyl ether or tetrahydrofuran being preferred. A solution of an aryl or alkyl alkali metal salt suitably phenyl lithium or butyl lithium in ether or tetrahydrofuran is then added. The mixture is then agitated for from about 1 to about 24 hours at from about 10° to about 30° C. in an inert atmosphere, nitrogen atmosphere being preferred. A solution of the halide in a similar solvent, for example ether or tetrahydrofuran is then added and the mixture agitated at from about 10° C. to about 80° C. for a further period of from about 10 to about 24 hours, agitation at about 15°–30° C. for about 18 hours being especially preferred. The product is then isolated, suitably a saturated brine solution is added to the mixture and the mixture extratced with a water immiscible solvent such as benzene or ether. The organic extract is then dried over a suitable drying agent such as sodium sulfate, filtered and the solvent removed, preferably by evaporation under reduced pressure. The residue is then further purified by chromatography.

In another modification of the process the 17β-hydroxy steroid for example, 17α-chloroethynyl-17β-hydroxy-19-nor-4,9-androstadien-3-one is treated with a dialkyl sulfate in an aqueous alkaline medium to produce the corresponding 17β-alkoxy compounds. The diaralkyl, dialkyl and dicycloalkyl sulfates which may be used in this modification include dimethyl sulfate, diethyl sulfate, dipropyl sulfate, diisopropyl sulfate, dibutyl sulfate, diisobutyl sulfate, diamyl sulfate, diisoamyl sulfate, dihexyl sulfate, dibenzyl sulfate, dicyclopentyl sulfate, dicyclohexyl sulfate, and the like. Sodium or potassium hydroxide in aqueous solution are preferred as the alkaline medium.

The steroid alcohol for example, 17α-chloroethynyl-17β-hydroxy-19-nor-4,9-androstadien-3-one, is taken up in a reaction inert solvent such as benzene, toluene, ether or tetrahydrofuran and added to a mixture of the dialkyl sulfate in the aqueous alkaline medium. It is preferred to use a small excess of the dialkyl sulfate, an excess of about 5% to about 20% being suitable. The mixture is then allowed to stand for from 1 to 24 hours at a temperature of from about 10° to about 80° C., however, it is preferred to let the mixture stand for about 18 hours at from about 15° C. to about 30° C. Where the solvent utilized is substantially immiscible with the aqueous medium, it is preferred to agitate the mixture during the reaction time. The product is then isolated. In one method of isolation, the mixture is extracted with a reaction inert water immiscible solvent such as benzene or toluene. The extract is then dried over a drying agent for example over potassium carbonate, filtered and the solvent removed, suitably by evaporation under reduced pressure. The residue is then further purified by chromatography.

The useful and novel products within the scope of the present invention include 17α-chloroethynyl-19-nor-4,9-androstadien-3-one-17β-methyl ether, 17α-chloroethynyl-19-nor-4,9-androstadien-3-one-17β-ethyl ether, 17α-chloroethynyl-19-nor-4,9-androstadien-3-one-17β-propyl ether, 17α-chloroethynyl-19-nor-4,9-androstadien - 3 - one-17β-butyl ether, 17β-chloroethynyl-19-nor-4,9-androstadien-3-one-17β-amyl ether, 17α-chloroethynyl-19-nor-4,9-androstadien - 3 - one - 17β-cyclopentyl ether, 17α-chloroethynyl-19-nor-4,9-androstadien - 3 - one-17β-cyclohexyl ether, 17α-bromoethynyl-19-nor-4,9-androstadien-3-one-17β-amyl ether, 17α-bromoethynyl-19-nor-4,9-androstadien-3-one-17β-methyl ether, 17α-bromoethynyl-19-nor-4,9-androstadien - 3 - one-17β-benzyl ether, 17α-fluoroethynyl-19-nor-4,9-androstadien-3-one-17β-propyl ether, 17α-trifluorovinyl-19-nor-4-androstene - 3 - one-17β-allyl ether, 17α-trifluoromethylvinyl-19-nor-5(10)-androstene-17β-cyclohexenyl ether, 17α-trifluoromethylethynyl-19-nor-4-androstene-17β-diethyl amino ethyl ether, 17α-trifluoromethylvinyl-19-nor-5(10)-androstene - 17β - pyrrolidyl ethyl ether and 17α-trifluoromethylethynyl-19-nor-4-androstene-17β-morpholino propyl ether.

The compounds of this invention may be administered alone or associated with a pharmaceutical carrier, choice of which depends upon the properties of the active compound and standard pharmaceutical practice. Generally, the compound is administered in dosages of the same order of magnitude as other progestational agents such as Norethisterone and dosage units may take the form of tablets, powders, capsules, elixirs, or syrups which are particularly useful for oral ingestion. Liquid diluents are employed as a condition for parenteral use.

The following examples are given by way of illustration

EXAMPLE 1

A solution consisting of 1.7 g. (1.32 cc.) of cis-1,2-dichloroethylene in 10 cc. of sodium-dried ether is added over 0.5 hour at 0° C. to 3 cc. of a 1.4 N solution of methyl lithium (prepared by adding lithium to methyl iodide in dry ether solution under nitrogen at about 10° C.) in 25 cc. of sodium-dried ether. The reaction mixture is stirred at room temperature under nitrogen for an additional 1½ hours, followed by the addition, over a 15-minute period, of 100 mg. of 3-methoxy-19-nor-2,5(10)-androstadiene-17-one in 4 cc. of sodium-dried ether. The mixture is left stirring at room temperature overnight, poured into ice water and extracted with ether. The ether extracts are washed with water, dried over sodium sulfate and concentrated in vacuo. The residue is chromatographed on 10 g. of basic alumina. The product is eluted with petroleum ether:ether 8:2. Crystallization from acid-free methanol affords 48 mg. of 17α-chloroethynyl-3-methoxy-19-nor-2,5(10)-androstadiene-17β-ol, m.p. 112–115° C.

I.R. $\lambda_{max}^{Nujol}$ 2.80, 4.48, 6.02, 6.12 μ.

Analysis.—(calculated for $C_{21}H_{27}O_2Cl$): C, 72.71; H, 7.85. Found: C, 72.85; H, 8.13. $[\alpha]_D^{26°}+68.6°$ (C=1 in dioxane).

In accordance with the above procedures, by using 1,2-dibromoethylene in place of 1,2-dichloroethylene, there is obtained the 17α-bromoethynyl-3-methoxy-19-nor-2,5(10)-androstadiene-17β-ol.

In accordance with the above procedure, but using 1-chloro-2-fluoroethylene in place of 1,2-dichloroethylene, there is obtained a mixture of the 17α-chloroethynyl and the 17α-fluoroethynyl-3-methoxy-19-nor-2,5(10)-androstadiene17β-ol, which compounds are separated by chromatography.

EXAMPLE 2

To 100 mg. of 17α-chloroethynyl-17β-hydroxy-19-nor-5(10)-androstene-3-one in 5 cc. of pyridine is added one equivalent of bromine. The reaction mixture is stirred for two hours at room temperature, poured into ice water and the aqueous mixture extracted with ether. The ether extract is washed with water, dried over sodium sulfate, and concentrated in vacuo to yield 17α-chloroethynyl-17β-hydroxy-19-nor-4,9-androstadiene-3-one.

In accordance with the above procedures, but starting with the 17α-bromoethynyl- or the 17α-fluoroethynyl-17β-hydroxy-19-nor-5(10)-androstene3-one in place of the 17α-chloroethynyl-17β-hydroxy-19-nor-5(10)-androstene-3-one there are obtained as products the corresponding 17α-bromoethynyl- or the 17α-fluoroethynyl-17β-hydroxy-19-nor-4,9-androstadiene-3-one.

EXAMPLE

To 100 mg. of 17α-chloroethynyl-17β-hydroxy-19-nor-5(10)-androstene-3-one in 5 cc. of pyridine is added one equivalent of bromine. The reaction mixture is stirred for fifteen hours at room temperature, poured into ice water and the aqueous mixture extracted with ether. The ether extract is washed with water, dried over sodium sulfate, and concentrated in vacuo to yield 17α-chloroethynyl-17β-hydroxy-19-nor-4,9-androstadiene-3-one.

In accordance with the above procedures, but starting with the 17α-bromoethynyl- or the 17α-fluoroethynyl-17β-hydroxy-19-nor-5(10)-androstene-3-one in place of the 17α-chloroethynyl-17β-hydroxy-19-nor-5(10)-androstene-3-one there are obtained as products the corresponding 17α-bromoethynyl- or the 17α-fluoroethynyl-17β-hydroxy-19-nor-4,9-androstadiene-3-one.

EXAMPLE 4

A mixture of 500 mg. of 17α-chloroethynyl-17β-hydroxy-19-nor-4,9-androstadiene-3-one, 10 ml. of dimethyl formamide, 20 ml. of ethyl iodide, and 1.5 grams of silver oxide are stirred at room temperature for 4 days, an additional ½ gram of silver oxide being added at the end of each day. 100 ml. of chloroform is then added to the reaction mixture and the mixture is stirred for one hour and filtered. The filtrate is evaporated to dryness and the residual oil is chromatographed over acid washed alumina and eluted with mixtures of ether and petroleum ether to give 17α-chloroethynyl-19-nor-4,9-androstadien-3-one-17β-methyl ether.

In accordance with the above procedure but starting with 17α-bromoethynyl-17β-hydroxy-19-nor-4,9-androstadien-3-one and 17α-fluoroethynyl-17β-hydroxy-19-nor-4,9-androstadien-3-one in place of 17α-chloroethynyl-17β-hydroxy-19-nor-4,9-androstadien-3-one there is obtained 17α-bromoethynyl-19-nor-4,9-androstadien-3-one-17β-methyl ether and 17α-fluoroethynyl-19-nor-4,9-androstadien-3-one-17β-methyl ether.

In accordance with the above procedure but starting with any of the aforementioned 17β-hydroxy androstadienes and using ethyl, propyl, butyl, amyl, hexyl, benzyl, cyclopentyl, cyclohexyl, allyl, cyclohexenyl, diethylamino ethyl, pyrrolidyl ethyl, morpholino ethyl, iodides or bromide in place of methyl iodide there are obtained the corresponding 17β-ethoxy, 17β-propoxy, 17β-butoxy, 17β-amoxy, 17β-hexoxy, 17β-benzyloxy, 17β-cyclopentyloxy, 17β-cyclohexoxy, 17β-allyloxy, 17β-cylohexenoxy, 17β-diethylamino ethoxy, 17β-pyrrolidylethoxy, 17β-morpholino ethoxy androstadienes.

EXAMPLE 5

To a mixture of 710 milligrams of 17α-bromoethynyl-17β-hydroxy-19-nor-4,9-androstadiene-3-one and 20 ml. cyclopentyl iodide in 100 milliliters of benzene are added a suspension of 5 grams of sodium hydride in 20 milliliters of benzene and the mixture stirred at about 20° C. for 2 days under a nitrogen atmosphere. 100 milliliters of water are then added to the mixture which is then stirred for a further hour. The organic layer is separated and the water layer extracted with benzene. The combined benzene extracts are then dried over anhydrous potassium carbonate, filtered, and evaporated under reduced pressure. The residue is then chromatographed over acid washed alumina and eluted with mixtures of ether and petroleum ether to give 17α-bromoethynyl-19-nor-4,9-androstadiene-3-one 17β-cyclopentyl ether.

In accordance with the above procedure but starting with 17α-fluoroethynyl-17β-hydroxy-19-nor-4,9-androstadiene-3-one and 17α-chloroethynyl-17β-hydroxy-19-nor-4,9-androstadiene-3-one in place of 17α-bromoethynyl-17β-hydroxy-19-nor-4,9-androstadiene-3-one there is obtained 17α-fluoroethynyl-19-nor4,9-androstadiene-3-one-17β-cyclopentyl ether, and 17α-fluoroethynyl-19-nor-4,9-androstadiene-17β-cyclopentyl ether.

In accordance with the above procedure but starting with any of the aforementioned 17β-hydroxy androstadienes and using methyl, ethyl, propyl, butyl, amyl, hexyl, benzyl and cyclohexyl iodides or bromide in place of 17β-methoxy, 17β-ethoxy, 17β-propoxy, 17β-butoxy, 17β-amoxy, 17β-hexoxy, 17β-benzyloxy, 17β-cyclohexoxy androstadienes.

EXAMPLE 6

To a solution of 744 mg. of 17α-bromoethynyl-17β-hydroxy-19-nor-4,9-androstadiene-3-one in 30 ml. of tetrahydrofuran is added a solution containing 2 g. of phenyl lithium. The mixture is then stirred for 2 hours at 20° C. under nitrogen. A solution of 5 g. of n-butyl iodide in 10 ml. of tetrahydrofuran is then added and the mixture stirred under nitrogen at 20° c. for a further 18 hours. The reaction mixture is then decomposed by the addition of a saturated aqueous solution of sodium chloride. The mixture is then thoroughly extracted with benzene and the organic extract dried over sodium sulfate, filtered, and evaporated under reduced pressure. The residue is then chromatographed over acid washed alumina and eluted with mixture of ether and petroleum ether to give 17α-bromoethynyl - 19 - nor - 4,9 - androstadien-3-one-17β-n-butylether.

In accordance with the above procedure but starting with 17α-fluoroethynyl-17β-hydroxy-19-nor-4,9-androstadien-3-one and 17α - chloroethynyl-17β-hydroxy-19-nor-4,9-androstadien-3-one in place of 17α-bromoethynyl-17β-hydroxy-19-nor-4,9-androstadien-3-one, there is obtained 17α-fluoroethynyl-19-nor-4,9-androstadien-3-one-17β-n-butyl ether, and 17α-chloroethynyl-19-nor-4,9-androstadien-17β-n-butyl ether.

In accordance with the above procedure but starting with any of the aforementioned 17β-hydroxy androstadienes and using methyl, ethyl, propyl, amyl, hexyl, benzyl, cyclopentyl and cyclohexyl iodides or bromide in place of n-butyl iodide there are obtained the corresponding 17β-methoxy, 17β-ethoxy, 17β-propoxy, 17β-amoxy, 17β-hexoxy, 17β-benzyloxy, 17β-cyclopentyloxy, 17β-cyclohexoxy androstadienes.

EXAMPLE 7

To a mixture of 1 g. of dimethyl sulfate in 10 ml. of N-sodium hydroxide is added a solution of 734 mg. of 17α - chloroethynyl-17β-hydroxy-19-nor-4,9-androstadien-3-one in 50 ml. of benzene. The mixture is then vigorously agitated for 18 hours at 20° C. At the end of this time, the mixture may have formed an emulsion which is then reconstituted into its constituent parts by the addition of a small amount of ethanol and solid sodium chloride. The organic layer is then separated and the aqueous layer thoroughly extracted with benzene. The organic extract is then dried over potassium carbonate, filtered and the solvent removed by evaporation under reduced pressure. The residue is then chromatographed over acid washed alumina and eluted with mixture of ether and petroleum ether to give 17α-chloroethynyl-19-nor-4,9-androstadiene-3-one-17β-methyl ether.

In accordance with the above procedure but starting with 17α-bromoethynyl-17β-hydroxy-19-nor-4,9-androstadien-3-one and 17α-chloroethynyl-17β-hydroxy-19-nor-4,9-androstadien-3-one in place of 17α-chloroethynyl-17β-hydroxy-19-nor-4,9-androstadien-3-one, there is obtained 17α-bromoethynyl-19-nor-4,9-androstadien-3-one-17β-methyl ether.

In accordance with the above procedure but starting with any of the aforementioned 17β-hydroxy androstadienes and using ethyl, propyl, butyl, amyl, hexyl, cyclopentyl and cyclohexyl iodides or bromide in place of methyl iodide, there are obtained the corresponding 17β-ethoxy, 17β-proxy, 17β-butoxy, 17β-amoxy, 17β-hexoxy, 17β-cyclopentyloxy, 17β-cyclohexoxy androstadienes.

We claim:
1. 17α - haloethynyl-17β-aralkoxy-19-nor-4,9-androstadien-3-one.
2. 17α - haloethynyl - 17β - cycloalkoxy-19-nor-4,9-androstadien-3-one.
3. 17α - haloethynyl - 19 - nor-4,9-androstadien-3-one-17β-unsaturated aliphatic hydrocarbon ether.
4. 17α - haloethynyl - 19 - nor-4,9-androstadien-3-one-17β-substituted aminoalkyl ether.
5. 17α - chloroethynyl-17β-cycloalkoxy-19-nor-4,9-androstadien-3-one.
6. 17α - chloroethynyl-17β-diethylaminoethoxy-19-nor-4,9-androstadien-3-one.
7. 17α - bromoethynyl-17β-diethylaminoethoxy-19-nor-4,9-androstadien-3-one.
8. 17α - chloroethynyl-17β-cyclopentoxy-19-nor-4,9-androstadien-3-one.
9. 17α - bromoethynyl - 17β - cyclopentoxy-19-nor-4,9-androstadien-3-one.
10. 17α - chloroethynyl - 17β-benzyloxy-19-nor-4,9-androstadien-3-one.
11. 17α - bromoethynyl - 17β-benzyloxy-19-nor-4,9-androstadien-3-one.
12. 17α - chloroethynyl - 19 - nor-4,9-androstadien-3-one-17β-allyl ether.
13. 17α - bromoethynyl-19-nor-4,9-androstadien-3-one-17β-allyl ether.
14. 17α - bromoethynyl-19-nor-4,9-androstadiene-17β-pyrrolidyl ethyl ether.
15. 17α - chloroethynyl-19-nor-4,9-androstadiene-17β-pyrrolidyl ethyl ether.

References Cited

UNITED STATES PATENTS 3,092,623   6/1963   Hirschmann _____ 260—239.5

ELBERT L. ROBERTS, *Primary Examiner.*

LEWIS GOTTS, *Examiner.*